United States Patent [19]

Kawaguchi et al.

[11] 4,297,553
[45] Oct. 27, 1981

[54] ENCLOSED SWITCHING APPARATUS

[75] Inventors: Yoshihiro Kawaguchi; Kōsuke Higuchi, both of Yokohama; Yoshiro Kitajima, Nagano, all of Japan

[73] Assignee: Tokyo Shibaura Denki Kabushiki Kaisha, Kanagawa, Japan

[21] Appl. No.: 12,012

[22] Filed: Feb. 14, 1979

[30] Foreign Application Priority Data

Feb. 24, 1978 [JP] Japan ................... 53/19879

[51] Int. Cl.³ .................. H01H 33/14; H01H 33/54
[52] U.S. Cl. ..................... 200/145; 200/148 B; 200/144 B
[58] Field of Search .......... 200/145, 148 B, 148 R, 200/144 B

[56] References Cited

U.S. PATENT DOCUMENTS 3,485,971 12/1969 Boersma et al. ............... 200/145

OTHER PUBLICATIONS

"Metal-Enclosed SF₆-Insulated Switchgear for Rated Voltage from 420 to 525 KV", by Gunther Gilmozzi, Siemens Review XLIV (1977), No. 7, Jul. 1, 1977, pp. 315-319.
Instruction of "Metalclad, SF₆ Insulated High-Voltage Switchgear", published by Brown, Boveri & Co. Ltd., Inc. 1976.

Primary Examiner—Robert S. Macon
Attorney, Agent, or Firm—Stevens, Davis, Miller & Mosher

[57] ABSTRACT

Enclosed switching apparatus has a tank, a circuit breaker, a pair of contact pedestals provided on both sides of the circuit breaker, and a disconnecting switch. The tank is provided with a lead-out portion extending in a direction perpendicular to the axis of the breaker and disposed adjacent to one of the contact pedestal. The disconnecting switch is at least partially disposed in the lead-out portion, with the axis of the disconnecting switch being coincident with the axis of the lead-out portion. An operating device is provided for operation of the movable contact of the disconnecting switch. A drive bar member couples the movable contact to the operating device, extends through the tank along a line of extension of the axis of the disconnecting switch and includes a conductor portion electrically connected to the movable contact. A slide contact is mounted on the above-mentioned one of the contact pedestals to slidably receive the conductor portion of the drive bar member.

6 Claims, 8 Drawing Figures

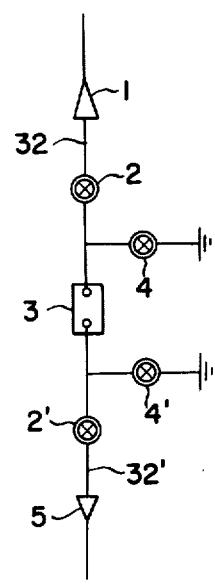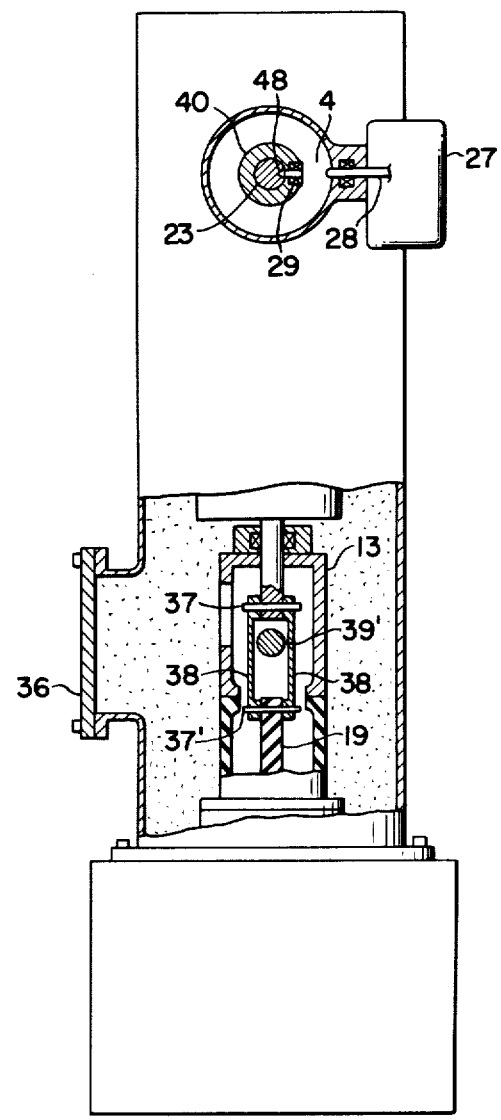

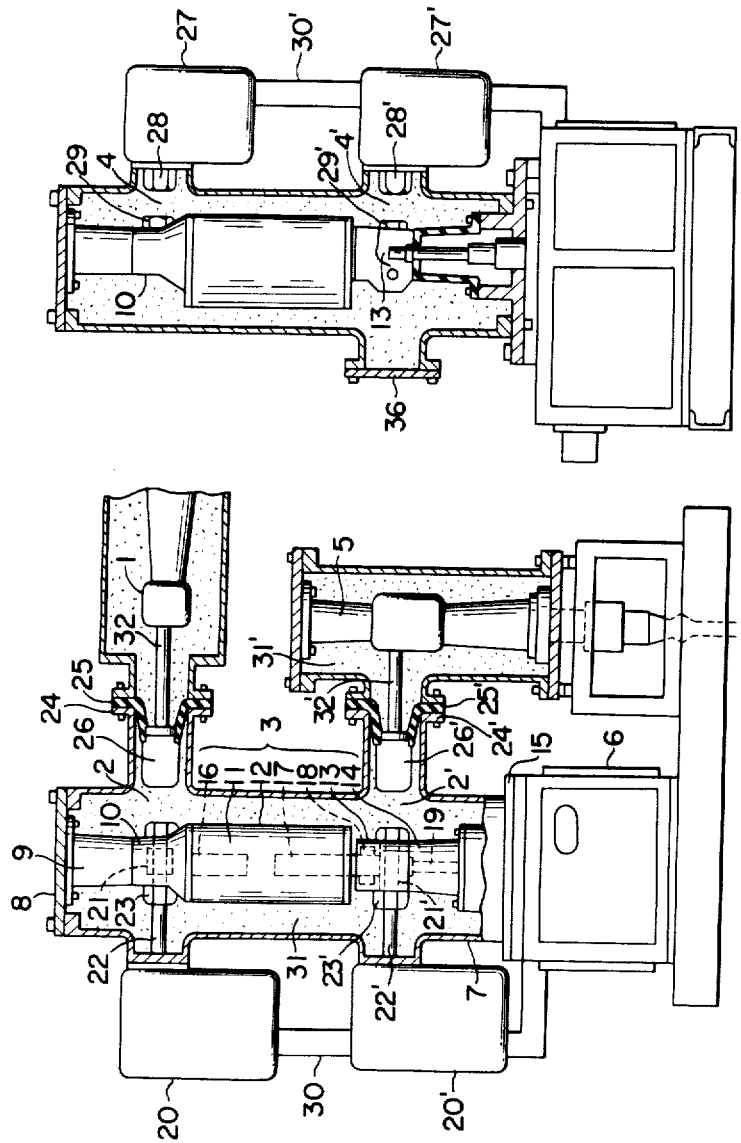

1

ENCLOSED SWITCHING APPARATUS

BACKGROUND OF THE INVENTION

The present invention relates to enclosed switching apparatus comprising a circuit breaker, and a disconnecting switch.

A conventional enclosed switching apparatus generally comprises a combination of a circuit breaker, a disconnecting switch, and a grounding switch, each being formed as an independent enclosed unit. The units are adaptable to various types of electric circuits. With this construction, there is an advantage that a fault in one of the units does not extend to others. Where the circuit breaker, which serves the most essential role and occupies the largest space in an enclosed switching apparatus, is of a gasfilled type, the breaking operation produces a decomposition gas. With the conventional enclosed switching apparatus, production of the decomposition gas in the circuit breaker unit does not affect the disconnecting switch or the grounding switch. However, because the units are separately enclosed, the overall size and the cost of the conventional enclosed switching apparatus are relatively large.

SUMMARY OF THE INVENTION

An object of the invention is to reduce the size as well as the cost of the enclosed switching apparatus.

According to the invention, there is provided enclosed switching apparatus having a tank, a circuit breaker including an interrupter, a pair of contact pedestals provided at both ends of said interrupter, and a disconnecting switch including a stationary contact and a movable contact engageable with the stationary contact, characterized in that the tank is provided with a lead-out portion extending in a direction perpendicular to the axis of the interrupter and disposed adjacent to one of said contact pedestals, the disconnecting switch is at least partially disposed in the lead-out portion, with the axis of the disconnecting switch being substantially coincident with the axis of the lead-out portion, and the enclosed switching apparatus comprises an operating device for operating the movable contact, a drive bar member mechanically coupling the movable contact to the operating device, extending through the tank substantially along a line of extension of the axis of the disconnecting switch and including a conductor portion electrically connected to the movable contact, and a slide contact mounted on the above-mentioned one of the contact pedestals to slidably receive the conductor portion of the drive bar member.

BRIEF DESCRIPTION OF THE DRAWINGS

In the accompanying drawings;

FIG. 1 is a wiring diagram showing one embodiment of the enclosed switching apparatus the invention, FIG. 3 shows a side view of the enclosed switching apparatus of FIG. 2, partly in section taken along a line III—III, FIG. 5 shows a sectional view of another enbodiment of the invention, FIG. 6 shows a sectional view of the enclosed switching apparatus of FIG. 5.

DESCRIPTION OF THE PREFERRED EMBODIMENTS

Figure 2:
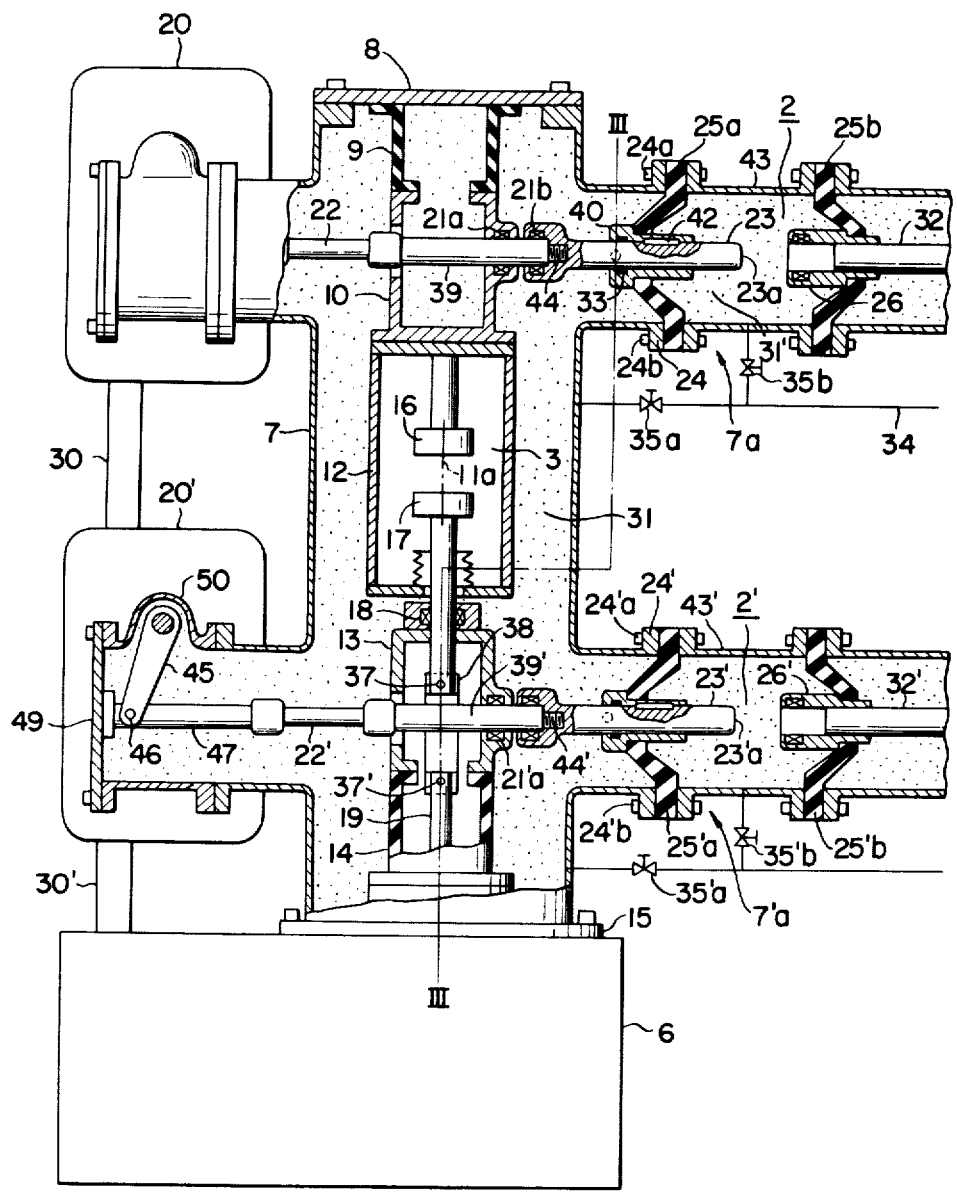
FIG. 2 shows a sectional view of the enclosed switching apparatus of FIG. 1.

Referring to FIGS. 1 through 4, there is shown one embodiment of the enclosed switching apparatus according to the invention. FIG. 1 shows a single-phase wiring diagram, in which denoted by numeral 1 is a bushing, 2 and 2' disconnecting switches, 3 a circuit breaker, 4 and 4' grounding switches, 5 a cable head, and 32 and 32' lead conductors.

The casing of an operating device 6 for the circuit breaker 3 forms a base of the switching apparatus. Mounted on the casing of the operating device 6 is an enclosed tank 7 including a main cylindrical portion.

As illustrated, the circuit breaker 3 is disposed in the center of and concentrically with the main cylindrical portion of the tank 7 and contained in an insulating housing 12. The circuit breaker 3 is in the form of a vacuum switch and comprises an upper stationary contact 16 connected to the upper contact pedestal 10. A movable contact 17 is provided opposite to the stationary contact 16 and is engageable with the stationary contact 16. The movable contact 17 extends through a slide contact 18 and is coupled to the operating device 6 by means of a pin 37, a pair of connecting strips 38 (FIG. 3), another pin 37' and an insulating bar 19.

An upper contact pedestal 10 and a lower contact pedestal 13 are respectively provided at the upper end and the lower end of the circuit breaker 3. The upper contact pedestal 10 is supported by an upper insulating cylinder 9 which is secured to a top cover 8 removably fixed to the tank 7. The lower contact pedestal 13 is supported by a lower insulating cylinder 14, which is secured to a lower flange 15.

The tank 7 is provided with a pair of lead-out portions 7a, 7'a extending in a direction perpendicular to the axis 11a of the circuit breaker 3 and disposed adjacent to the upper and the lower contact pedestals 10, 13, respectively, i.e., at the upper right and the lower right of the tank 7, as viewed in FIG. 2. The upper disconnecting switch 2 includes an insulating spacer 25b for supporting a stationary contact 26 within the tank 43 and a lead conductor 32. The upper disconnecting switch 2 further includes another insulating spacer 25a for securing and supporting a guide 40 for a bar contact 23, one end 23a of which constitutes a movable contact engageable with the stationary contact 26, and mounted to a flange 24. Thus, the disconnecting switch 2 is provided in such a manner that its axis is coincident with the axis of the lead-out portion 7a.

An operating device 20 for the upper disconnecting switch 2 is provided opposite to the upper disconnecting switch 2, i.e., at the upper left of the tank 7 and is mounted to the main cylindrical portion. The operating device 20 is coupled to the disconnecting switch 2 by means of a drive bar member including an insulating bar 22 and a connecting bar 39 extending through a slide contact 21a mounted on the upper contact pedestal 10. The connecting bar 39 is threaded into the bar contact 23 for mechanical coupling. Electrical connection between the connecting bar 39 and the bar contact 23 is ensured by a slide contact 21b. The bar contact 23 and the connecting bar 39 thus mechanically and electrically connected to each other constitute a conductor portion of the drive bar member. The bar contact 23 is provided with a groove 42 to prevent rotation of the bar contact 23 as the connecting bar 39 is being threaded into the bar contact 23. A slide seal 33 mounted on the guide 40 provides hermetic seal for separating the gas in the disconnecting switch 2 from the gas in the circuit breaker 3.

A lower disconnecting switch 2' is disposed in the lower lead-out portion 7'a, and its construction is similar to that of the upper disconnecting switch 2, so that corresponding members are identified by the same reference numerals with a prime. An operating device 20' for the lower disconnecting switch 2' is disposed opposite to the lower disconnecting switch 2', i.e., at the lower left of the tank 7 and is mounted to the main cylindrical portion. There is also provided a drive bar member for coupling a movable contact 23'a to the operating device 20'. As illustrated, the drive bar member includes a bar contact 23', a connecting bar 39' and an insulating bar 22', as well as an operating link 47, coupled by a coupling pin 46, to a drive lever 45. a casing 50 on which the operating device 20' is mounted is provided with a cover 49, so that the connecting bar 39' can be taken out when the cover 49 is removed.

The connecting bar 39' of the disconnecting switch 2' extends between the pair of connecting strips 38, so that the operation of the lower disconnecting switch 2' does not interfer the operation of the circuit breaker 3.

The tank 7 has an inspection opening, at the portion where the connecting bar 39' and the connecting strips 38 intersect, and a cover 36 is provided to close the inspection opening.

The upper grounding switch 4 is shown in detail in FIG. 3. The grounding switch 4 comprises a grounding bar 28, a stationary contact 29 and an operating device 27. The grounding switch 4 is positioned on the section line III—III in FIG. 2 and mounted in such a manner that the axis of the grounding switch 4 is perpendicular to the axis of the bar contact 23 of the disconnecting switch 2. The bar contact 23 is provided with a locking hole 48 into which the grounding bar 28 is inserted, in order to prevent closure of the bar contact 23 of the disconnecting switch while the grounding switch 4 is in grounding state.

The lower grounding switch 4' is similar to the upper grounding switch 4, and the manner of mounting the same to the lower disconnecting switch 2' is similar to the upper grounding switch 4.

Thus the enclosed switching apparatus of the embodiment comprises the circuit breaker 3 at the center, and the disconnecting switches 2 and 2' and the grounding switches 4, and 4' above and below the circuit breaker 3. The sealed tank 7 is filled with an insulating gas 31 such as $SF_6$.

Although not illustrated, there are provided mechanical interlocks between the circuit breaker 3, the disconnecting switches 2 and 2' and the grounding switches 4 and 4'. Such mechanical interlocks may comprise links which are disposed in connecting conduit 30 and 30' (FIG. 2) and are operable in response to the operation of the operating devices 6, 20, 20', 27 and 27'. The mechanical interlocks are adapted to permit operation of the grounding switches 4 and 4' only when the circuit breaker 3 and the disconnecting switches 2 and 2' are open.

Connection of the enclosed switching apparatus with the external circuit is accomplished as follows. First, a lead conductor 32' is connected to the stationary contact 26' of the lower disconnecting switch 2' to enable connection with the power source. Similarly the lead conductor 32 is connected to the stationary contact 26 of the upper disconnecting switch 2 to enable connection with the load.

Operation of each of the circuit breaker 3, the disconnecting switches 2 and 2' and the grounding switches 4 and 4' is achieved by means of the corresponding operating devices, independently of each other.

Figure 4:
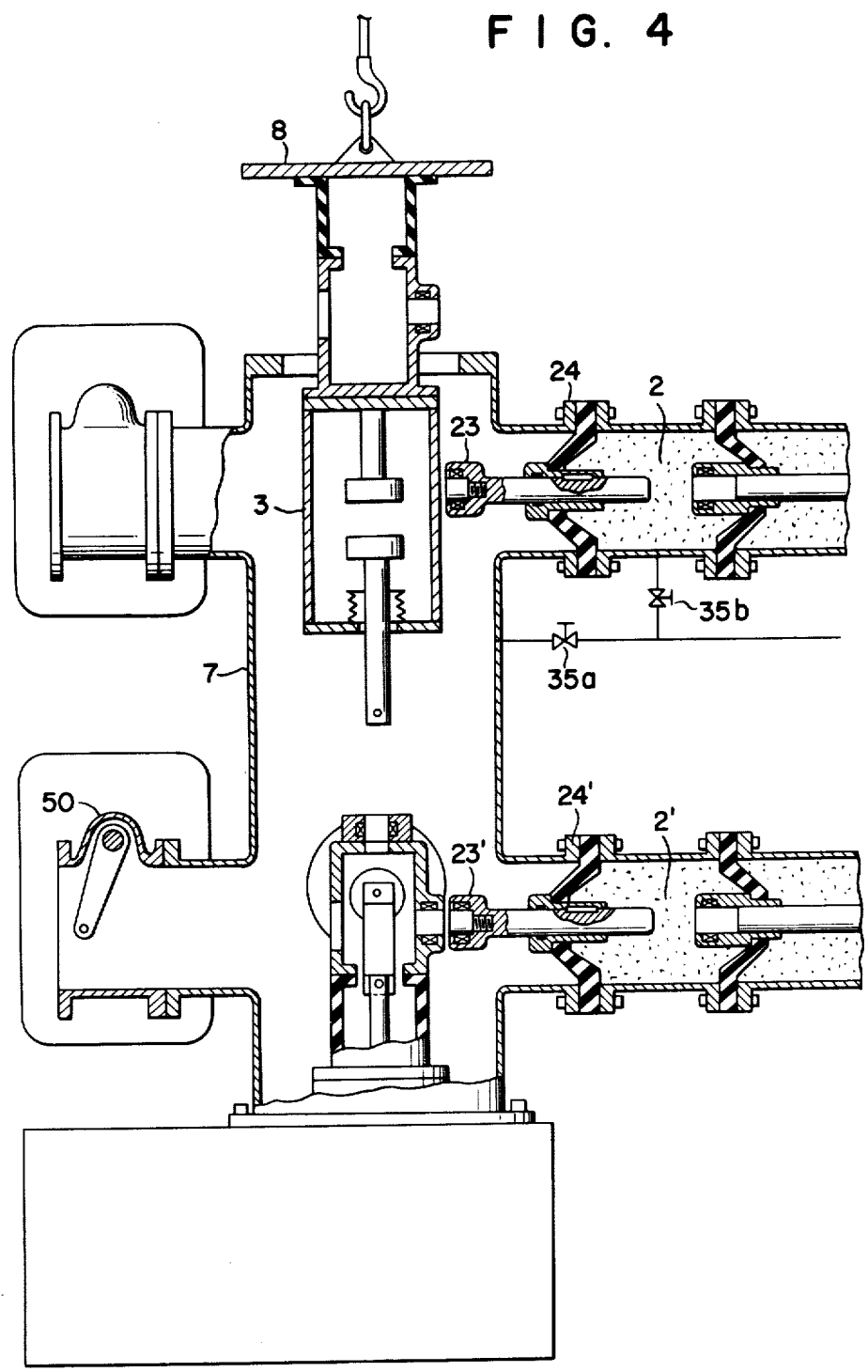
FIG. 4 shows how the interrupter of the enclosed switching apparatus is removed.

FIG. 4 shows how the circuit breaker 3 is removed. To inspect the breaker 3 or to exchange the contacts thereof the circuit breaker 3 has to be removed. Such removal is effected in the following manner. First, the grounding switches 4 and 4' are closed. Then, the stop valves 35b and 35'b are closed and the stop valves 35a and 35'a are opened to draw the gas 31 out of the tank 7. The cover 49 of the disconnecting switch 2' is removed and the connecting pin 46 is removed. The operating link 47 is then rotated to loosen the threads 44' and thus the connecting bar 39' is separated from the bar contact 23. Similar connecting parts associated with the upper disconnecting switch 2 are removed, and the inspection cover 36 is removed and the pin 37 is removed. Then securing bolts for the top cover 8 are removed and the circuit breaker 3 is lifted and removed.

Assembly is accomplished in the reverse sequence.

Instead of removing the circuit breaker 3 only a illustrated in FIG. 4, the tank 7 with the breaker 3 and the operating devices 6, 20 and 20' may be removed by loosening the bolts 24a, 24b, 24'a and 24'b associated with the flanges 24 and 24' and shifting the tank 7 to the left. These works may be carried out even when the conductors 32 and 32' are alive.

The invention has been described with reference to a single-phase circuit. However, the invention is applicable where three-phase conductors are used.

FIGS. 5 and 6 show another embodiment of the invention. In the embodiment of FIGS. 5 and 6, no separate tank, such as the tank 43 in FIG. 2, is not provided, but the lead-out portions 7a and 7'a are formed of the extrusions of the tank 7 itself. The bar contact 23 is received by a slide contact, mounted on the contact pedestal 10. FIG. 6 shows a sectional view of FIG. 5 and illustrates how the grounding switches 4 and 4' are mounted. As illustrated, the upper grounding switch 4 includes a stationary contact 29 which is mounted on the upper contact pedestal 10 and a grounding bar 28 engageable with the stationary contact 29. The lower grounding switch 4' has similar construction. The rest of the construction of the switching apparatus is similar to that of FIGS. 2 and 3, and the corresponding members are identified by the same reference numerals as in FIGS. 2 and 3. The embodiment of FIG. 5 can be adopted to enclosed switching apparatus of the type which is directly coupled to a cable 5, a bushing 1 and the like. The embodiment of FIG. 5 has an advantage over the embodiment of FIG. 2 in that the tank 43 for the disconnecting switch 2 and the insulators 25b and 25'b of FIG. 2 can be omitted and hence the size of the switching apparatus is further reduced. However, inspection and exchange of the circuit breaker 3 cannot be carried out when the conductor 32 is alive. Also, since the disconnecting switches 2 and 2' are disposed within the tank 7, the insulating strength of the disconnecting switches is lowered when the insulating gas 31 is removed. Moreover, it is dangerous to remove the circuit breaker 3 while the cable head 5 is alive, because of the relatively close distance between the live part and the circuit breaker.

Figure 7:
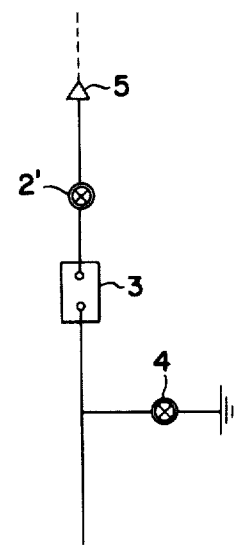
FIG. 7 shows a wiring diagram of a further embodiment of the invention.
Figure 8:
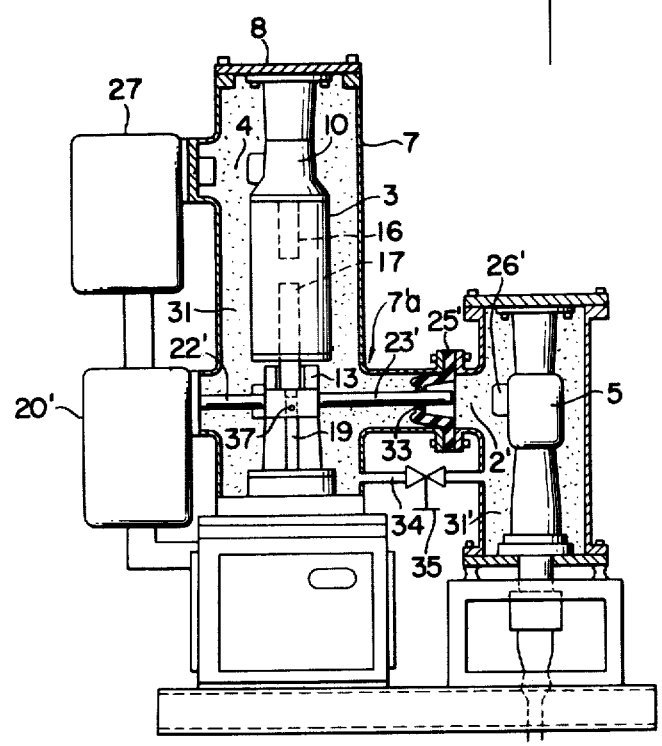
FIG. 8 shows a sectional view of the enclosed switching apparatus of FIG. 7.

FIGS. 7 and 8 show a further embodiment of the invention. As illustrated, a grounding switch 4 is provided at the left of the tank 7, adjacent to the upper contact pedestal 10, and a disconnecting switch 2' is provided at the right of the tank 7, adjacent to the lower contact pedestal 13. The stationary contact 26' of the disconnecting switch 2' is supported by a cable head 5, and a movable bar contact 23' is supported by and extends through a slide seal 33 mounted on the insulating spacer 25'. The movable bar contact 23' is coupled to an operating device 20' by means of an insulating bar 22'. A pipe 34 and a stop valve 35 are provided to establish communication and separation between the insulating gas 31' surrounding the cable head 5 and the insulating gas in the tank 7. The lower grounding switch 4' and the upper disconnecting switch 2 of FIG. 5 are omitted. The rest of the construction is similar to that of FIG. 5. Inspection and exchange of the circuit breaker 3 can be carried out even when the cable head is alive, in the following manner. The stop valve 35 is used to remove the insulating gas 31 and then the operating device 20' is operated to separate the movable bar contact 23' from the stationary contact 26'. Then, the inspection cover 36 is removed and the pin connecting the movable contact 17 to the insulating bar 19 is removed. Subsequently, the securing bolts for the top cover 8 are removed and the top cover 8 is lifted.

Instead of providing two operating devices for the upper and lower disconnecting switches, a single operating device may be used to simultaneously operate the two disconnecting switches. Moreover, the operating device for the disconnecting switch may be housed in the casing of the operating device for the circuit breaker. By doing so, the interlock mechanisms for the operating devices are simplified and their reliability is enhanced.

The enclosed switching apparatus according to the present invention has the following advantages.
(1) It is not necessary to alter the fundamental construction of the circuit breaker which constitutes the main part of the switching apparatus, so that size and weight of the switching apparatus are substantially reduced, and the cost of transport and the cost of installation are also reduced.
(2) With the conventional construction, the enclosed tank and insulating spacers are required for each of the circuit breaker and the disconnecting switches, as well as the grounding switches, when they are provided. According to the embodiments of this invention shown in FIGS. 5, 6 and 8, they are not required except for the circuit breaker, and hence the cost of the switching apparatus is reduced.
(3) The operating devices are all secured to the same tank, so that proper movement for the mechanical interlocks are ensured and reliability of the switching apparatus is improved.
(4) If the interrupter is surrounded by an insulating housing as in the illustrated embodiment, decrease of the insulating strength of the disconnecting switches, and the grounding switches when they are used, due to harmful gases produced at the time of interruption of the circuit breaker is prevented.
(5) In the embodiments of FIGS. 1 through 4 and FIGS. 7 and 8 even when the cable head is alive, the circuit breaker can be removed without danger.

What is claimed is:

1. An enclosed switching apparatus of the type having:
    a tank including a main cylindrical portion filled with an insulating gas and provided, at a first end thereof, with a removable cover,
    a circuit breaker provided in and concentrically with said main cylindrical portion of said tank and including a housing, a stationary contact provided at a first end of said circuit breaker adjacent to said first end of said tank, and a movable contact provided at a second end of said circuit breaker,
    first and second contact pedestals respectively provided at said first and second ends of said circuit breaker, and
    a disconnecting switch including a stationary contact and a movable contact engageable with said stationary contact,
    said tank being provided with a lead-out portion extending perpendicularly to the axis of said main cylindrical portion, with the axis of said lead-out portion intersecting the axis of said main cylindrical portion, and disposed adjacent to one of said contact pedestals, and said disconnecting switch being at least partially disposed in said lead-out portion, with the axis of said disconnecting switch being substantially coincident with the axis of said lead-out portion,
    said enclosed switching apparatus further comprising:
    a disconnecting switch operating device mounted to said main cylindrical portion for operating said movable contact of said disconnecting switch,
    a drive bar member mechanically coupling said movable contact to said operating device, said drive bar member extending through said one of said contact pedestals and crossing the axis of said main cylindrical portion of said tank, substantially along a line of extension of the axis of said disconnecting switch, and including a conductor portion electrically connected to said movable contact of said disconnecting switch,
    a slide contact mounted on said one of said contact pedestals to slidably receive said conductor portion of said drive bar member,
    a circuit breaker operating device provided at a second end of said tank opposite to said first end, and including an insulating member movable for operating said movable contact of said circuit breaker,
    said movable contact of said circuit breaker being detachable from said insulating member of said circuit breaker operating device.

2. Enclosed switching apparatus as set forth in claim 1, further comprising an insulating spacer provided in said lead-out portion to hold said stationary contact of said disconnecting switch.

3. Enclosed switching apparatus as set forth in claim 1 or 2, further comprising another slide contact for receiving said conductor portion of said drive bar member of said disconnecting switch, an insulating spacer for holding the last-mentioned slide contact, and a grounding switch including a stationary contact provided on the last-mentioned slide contact, and a grounding bar engageable with said stationary contact of said grounding switch.

4. Enclosed switching apparatus as set forth in claim 1 or 2, further comprising a grounding switch including a stationary contact mounted on the above-mentioned one of said contact pedestals and a grounding bar engageable with said stationary contact of said grounding switch.

5. An enclosed switching apparatus as set forth in claim 1, further comprising an insulating member secured to said cover and supporting said first contact pedestal.

6. An enclosed switching apparatus as set forth in claim 5, wherein said circuit breaker comprises a vacuum circuit breaker.

* * * * *